(12) United States Patent
Klug

(10) Patent No.: US 11,142,063 B2
(45) Date of Patent: Oct. 12, 2021

(54) FILLER NECK FOR FILLING AN OPERATING SUBSTANCE OR ADDITIVE INTO A VEHICLE TANK BY MEANS OF A FUEL PUMP NOZZLE

(71) Applicant: ILLINOIS TOOL WORKS INC., Glenview, IL (US)

(72) Inventor: Julian Klug, Ochsenfurt (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/935,601

(22) Filed: Jul. 22, 2020

(65) Prior Publication Data

US 2021/0031619 A1    Feb. 4, 2021

(30) Foreign Application Priority Data

Aug. 1, 2019    (DE) ..................... 10 2019 120 841.6
Mar. 16, 2020   (DE) ..................... 10 2020 107 169.8

(51) Int. Cl.
*B60K 15/04* (2006.01)
*B60K 15/03* (2006.01)

(52) U.S. Cl.
CPC .... *B60K 15/04* (2013.01); *B60K 2015/03348* (2013.01); *B60K 2015/048* (2013.01); *B60K 2015/0461* (2013.01); *B60K 2015/0477* (2013.01)

(58) Field of Classification Search
CPC .......... B60K 15/04; B60K 2015/03348; B60K 2015/0461; B60K 2015/0477; B60K 2015/048; B60K 2015/0483; B60K 2015/047; B60K 2015/0458

USPC ........................................................ 141/350
See application file for complete search history.

(56) References Cited

U.S. PATENT DOCUMENTS

| 3,730,216 A | * | 5/1973 | Arnett ................... F16K 1/2007 137/588 |
| 4,091,959 A | * | 5/1978 | O'Banion .......... B60K 15/0406 220/304 |
| 4,738,376 A | * | 4/1988 | Markus ................ B65D 47/148 220/834 |
| 5,435,358 A | * | 7/1995 | Kempka ................ B60K 15/04 141/312 |

(Continued)

FOREIGN PATENT DOCUMENTS

| DE | 102014111834 A1 | 2/2016 |
| EP | 1371512 A2 | 12/2003 |

(Continued)

*Primary Examiner* — Timothy L Maust
*Assistant Examiner* — James R Hakomaki
(74) *Attorney, Agent, or Firm* — Thompson Hine LLP

(57) ABSTRACT

A filler neck (1) for filling an operating substance, such as fuel or AdBlue® or urea, or an additive, such as water, into a vehicle tank by way of a fuel pump nozzle. The filler neck (1) has a filler neck body (2), which can be accommodated in a filler pipe leading to the vehicle tank. The filler neck (1) furthermore has a fuel pump nozzle guide with an insertion section (4) for guiding a fuel pump nozzle, which is accommodated or is to be accommodated in the filler neck body (2), in the direction of the vehicle tank. The filler neck body (2) and the insertion section (4) of the fuel pump nozzle guide are formed together as an integral casting, in particular plastics injection moulding.

17 Claims, 7 Drawing Sheets

(56) References Cited

U.S. PATENT DOCUMENTS

| | | | | |
|---|---|---|---|---|
| 5,839,489 A * | 11/1998 | Ganachaud | ............ | B60K 15/04 141/382 |
| 6,026,855 A * | 2/2000 | Jackson | ........... | B60K 15/03504 137/512.15 |
| 6,230,739 B1 * | 5/2001 | Gericke | ................. | B60K 15/04 137/588 |
| 6,755,057 B2 * | 6/2004 | Foltz | ..................... | B60K 15/04 141/312 |
| 7,461,673 B2 * | 12/2008 | Busch | ............... | B60K 15/0406 141/348 |
| 8,567,458 B2 * | 10/2013 | Sato | ....................... | B60K 15/04 141/350 |
| 8,596,315 B2 * | 12/2013 | Muller | .................. | B60K 15/04 141/350 |
| 8,726,950 B2 * | 5/2014 | Miller | ..................... | B60K 15/04 141/350 |
| 8,741,214 B2 * | 6/2014 | Evans | ...................... | B22F 5/10 419/8 |
| 8,857,643 B2 * | 10/2014 | Fetzer | .................. | B29C 65/665 220/86.2 |
| 8,869,846 B2 * | 10/2014 | Gerdes | .................. | B60K 15/04 141/350 |
| 9,315,099 B2 * | 4/2016 | Whelan | .............. | B60K 15/0409 |
| 9,505,302 B2 * | 11/2016 | Yoshida | ................. | B60K 15/04 |
| 9,701,194 B2 * | 7/2017 | Groom | ................... | B60K 15/04 |
| 9,931,928 B2 * | 4/2018 | Kito | ....................... | B60K 15/04 |
| 2006/0096662 A1 * | 5/2006 | King | ....................... | B60K 15/04 141/367 |
| 2007/0056654 A1 * | 3/2007 | Poley | ..................... | B60K 15/04 141/369 |
| 2008/0237230 A1 | 10/2008 | Och | | |
| 2011/0079322 A1 * | 4/2011 | Beier | ................. | B60K 15/0406 141/350 |
| 2012/0279612 A1 * | 11/2012 | Washio | .................. | B60K 15/04 141/350 |
| 2015/0151633 A1 * | 6/2015 | Kito | ....................... | B60K 15/04 137/527 |
| 2016/0031317 A1 * | 2/2016 | Giles | ..................... | B60K 15/04 220/86.2 |
| 2016/0152133 A1 * | 6/2016 | Hendler | ................. | B60K 15/04 220/86.2 |
| 2017/0182880 A1 * | 6/2017 | Hagano | .................. | B60K 15/04 |
| 2017/0274761 A1 | 9/2017 | Kapaun | | |
| 2017/0297426 A1 | 10/2017 | Sperando | | |
| 2018/0135342 A1 * | 5/2018 | Pearce | ..................... | E05F 1/10 |

FOREIGN PATENT DOCUMENTS

| | | | | |
|---|---|---|---|---|
| EP | | 1712398 B1 | 10/2006 | |
| EP | | 2961629 B1 | 4/2018 | |
| JP | | 08296630 A * | 11/1996 | ............ B60K 15/04 |

\* cited by examiner

FILLER NECK FOR FILLING AN OPERATING SUBSTANCE OR ADDITIVE INTO A VEHICLE TANK BY MEANS OF A FUEL PUMP NOZZLE

The invention relates to a filler neck for filling an operating substance, such as, for example, fuel or AdBlue® or urea, or an additive, such as, for example, water, into a vehicle tank.

The invention furthermore relates to a fuel filler system with a filler neck of this type, wherein the fuel filler system is in particular a capless fuel filler system and can have a misfuelling block. However, the invention is not restricted to capless fuel filler systems; on the contrary, the filler neck is also suitable for conventional fuel filler systems with a screw cover or press-in cover.

According to one aspect of the present invention, the latter relates in particular to a filler system for an operating substance tank or additive tank, in particular fuel tank, AdBlue® tank or water tank, with a filler neck. According to embodiments of the invention, the filler neck can have at least one closure element, in particular in the form of a closure flap, which closure element or closure flap is acted upon in particular in a spring-loaded manner into a closure position closing the opening, wherein the closure flap is pivotable from the closure position into an opening position at least partially opening up the opening by insertion of the operating substance pump nozzle or additive pump nozzle into the filler neck.

Such a filler system for an operating substance tank or additive tank of, for example, a motor vehicle (e.g. a passenger vehicle or truck) is also referred to as "capless", since the closure element (closure flap) which is opened by means of the operating substance pump nozzle or additive pump nozzle itself and which automatically closes again makes it possible to dispense with a cover which has to be released or has to be fastened manually.

The filler neck is designed to be integrated in the body structure of the motor vehicle in order to form a fluid-conducting connection to the operating substance tank. The inner region of the filler neck ensures in particular that the inserted part of the operating substance pump nozzle or additive pump nozzle is guided and held with little play.

On the other hand, it is known to provide in particular fuel pump nozzles for gasoline and for diesel fuel with differing diameters. This measure has been introduced after lead free gasoline had to be differentiated from leaded fuel. The fuel pump nozzles for leadfree gasoline have a smaller outside diameter than the fuel pump nozzles for leaded fuel and for diesel fuel.

Furthermore, it is known to provide an insertion section that narrows conically, for example in the direction of the fuel tank, as a fuel pump nozzle guide in the filler neck body, wherein the narrow cross section of the insertion section can be smaller than the cross section of a diesel fuel pump nozzle. The fuel pump nozzle guide serves to guide a fuel pump nozzle, which is accommodated or is to be accommodated in the filler neck body, in the direction of the vehicle tank.

If, in the case of the insertion section, the narrow cross section of the insertion section is smaller than the cross section of a diesel fuel pump nozzle, and if furthermore the filler neck is provided with a closure element (closure flap) which is opened by means of the operating substance pump nozzle or additive pump nozzle itself, a misfuelling block can be realized, with which it is effectively prevented that the fuel tank is refueled with diesel via the filler neck.

Specifically, the effect which can be achieved with such a design is that a diesel fuel pump nozzle which is inserted into the filler neck body cannot enter into contact with a closure flap or a closure element that is assigned to the end region of the filler neck body that faces the fuel tank and which, in its closed position, closes the passage to the fuel tank.

This applies of course only for the case in which the fuel pump nozzles for gasoline have a smaller outside diameter than the fuel pump nozzles for diesel fuel.

If a diesel fuel pump nozzle is therefore inserted into the filler neck, the closure element assigned to the end region of the filler neck body that faces the vehicle tank does not open, and therefore the diesel fuel remains in the filler neck body and the fuel pump nozzle automatically switches off. As is known, fuel pump nozzles for fuel (diesel or gasoline) contain a mechanism which blocks a valve in the fuel pump nozzle as soon as a certain back pressure builds up.

If, by contrast, a fuel pump nozzle for gasoline is inserted into the filler neck, the fuel pump nozzle reaches the closure element assigned to that end region of the filler neck body which faces the vehicle tank, and therefore said closure element is correspondingly actuated and is at least partially open from its prestressed closed position and opens the passage to the fuel tank.

The known filler necks, in particular those which are designed to be "capless" and have a corresponding misfuelling block, are comparatively expensive to produce since they consist of a relatively large number of components which not only have to be produced individually but also have to be connected to one another during the assembly.

This problem also exists in the case of filler necks which are not designed, for example, to be capless and have a fuel pump nozzle guide with an insertion section for guiding a fuel pump nozzle, which is accommodated or is to be accommodated in the filler neck body, in the direction of the vehicle tank.

SUMMARY

Therefore, the invention is based on the object of specifying a filler neck for the filler system of an operating substance tank that can be produced as simply and therefore as cost-effectively as possible.

This object is achieved by the subject matter of independent patent claim 1.

Accordingly, the invention relates in particular to a filler neck for filling an operating substance, such as, for example, fuel or AdBlue® or urea, or an additive, such as, for example, water, into a vehicle tank by means of a fuel pump nozzle. The filler neck has a filler neck body, which can be accommodated in a filler pipe leading to the fuel tank. The filler neck furthermore has a fuel pump nozzle guide with an insertion section for guiding a fuel pump nozzle, which is accommodated or is to be accommodated in the filler neck body, in the direction of the fuel tank.

According to the invention, it is provided in particular that the filler neck body and the insertion section of the fuel pump nozzle guide are formed together as an integral casting, in particular plastics injection molding.

In order to securely guide a fuel pump nozzle, which is accommodated or is to be accommodated in the filler neck body, in the direction of the fuel tank, the insertion section of the fuel pump nozzle guide has in particular a shaping which is designed to surround the fuel pump nozzle, which is accommodated in the filler neck body, circumferentially by more than 180°, particularly preferably in a completely encircling manner, in particular annularly.

The insertion section here can have guide ribs which are spaced apart circumferentially from one another, for example three guide ribs arranged offset by 120° in each case, or more guide ribs arranged at a correspondingly smaller offset angle, and therefore the fuel pump nozzle is guided only in regions in the circumferential direction.

The internal size of the insertion section and external size of that region of the fuel pump nozzle which is to be inserted into the insertion section are preferably coordinated with each other in such a manner that there is little play (for example less than 10 mm, preferably less than 5 mm) and/or the fuel pump nozzle touches the insertion section during the insertion operation and/or refueling operation.

By means of the formation of the filler neck body and the insertion section of the fuel pump nozzle guide as a common, integral casting and in particular plastics injection molding, the overall number of components to be produced and to be mounted in order to form the filler neck is reduced in comparison to the known filler neck. In addition, production of the filler neck body together with the insertion section from plastic can be realized extremely cost-effectively at least during large scale production.

By means of the configuration according to the invention, the filler neck body and the insertion section of the fuel pump nozzle guide are therefore formed together integrally. The filler neck body together with the insertion section can be formed here in particular as a casting, and particularly preferably as a plastics injection molding, with it being possible optionally even to use a casting mold which only has two parts.

In order to permit demolding in a radial direction (with respect to a longitudinal axis of the filler neck body), it is provided, according to a preferred realization of the filler neck body, that the insertion section of the fuel pump nozzle guide has a first segment which is formed integrally with the filler neck body and is connected fixedly to the filler neck body in the interior of the filler neck body and at least one further, second segment which is connected in an articulated manner to the filler neck body.

The at least one second segment is pivotable relative to the filler neck body between a first position, in which the second segment is present outside the filler neck body, and a second position, in which the second segment is present within the filler neck body and, together with the first segment, forms the guide of a fuel pump nozzle, which is accommodated or is to be accommodated in the filler neck body, in the direction of the vehicle tank.

In the first position, the second segment is present at least with a part, particularly preferably substantially, i.e. preferably with at least 50% of its volume, very particularly preferably completely outside the filler neck body. In the second position, the second segment is present at least with a part, particularly preferably substantially, i.e. preferably with at least 50% of its volume, very particularly preferably completely within the filler neck body.

Here, "outside the filler neck body" or "within the filler neck body" should preferably be understood as meaning a region outside or within a preferably circular contour which has such a shaping, preferably such a radius, that the filler neck body can be inserted in a sealing manner into a filler pipe of the motor vehicle with the aid of sealing elements along said contour, preferably 0-sealing rings.

Preferably, the second segment of the insertion section is connected via at least one film hinge to the filler neck body so as to be pivotable relative to the filler neck body such that the filler neck body together with the segments of the insertion section can be formed in particular a casting and particularly preferably as a plastics injection molding. A pivot axis defined by the at least one film hinge is preferably intended here to run parallel to the longitudinal axis of the filler neck body.

In order for the at least one segment of the insertion section of the fuel pump nozzle guide to be able to be pivoted as simply as possible into the filler neck body, it is provided, according to a development of the invention, that the filler neck body at least in regions has a closed cylindrical lateral surface, wherein a window region is formed in said lateral surface, wherein the at least one second segment of the insertion section of the fuel pump nozzle guide is pivotable into the filler neck body via said window region.

It is not required here for the window region to be closed completely or even in a sealing manner—the window merely provides a space into which the second segment can be pivoted.

In the pivoted-in state of the second segment of the insertion section, the window region provided in the cylindrical lateral surface of the filler neck body can then be closed with the aid of the second segment.

So that the at least one second segment of the insertion section can be fixed to the filler neck body when the second segment has been pivoted into the filler neck body and is therefore in its second position, it is provided, according to refinements of the filler neck according to the invention, that the at least one second segment of the insertion section has at least one latching or locking element which correspondingly interacts with a latching or locking element, designed in a complementary manner corresponding thereto, on the filler neck body when the second segment is pivoted into the filler neck body.

According to one aspect of the invention, it is provided that the insertion section of the fuel pump nozzle guide narrows, for example narrows conically, at least in regions in the direction of the vehicle tank, wherein a narrow cross section of the insertion section of the fuel pump nozzle guide is larger than the cross section of a gasoline nozzle or an AdBlue® or urea nozzle, and in particular is smaller than the cross section of a diesel fuel pump nozzle.

In this embodiment, the fuel pump nozzle guide serves as a misfuelling block with which it is possible effectively to prevent a diesel fuel pump nozzle, the cross section of which is larger than the cross section of a gasoline nozzle or an AdBlue® or urea nozzle, passing through the narrow cross section of the insertion section of the fuel pump nozzle guide, said insertion section narrowing at least in regions in the direction of the vehicle tank.

According to embodiments of the invention, the insertion section of the fuel pump nozzle guide can be an insertion section which tapers conically at least in regions in the direction of the fuel tank. However, the invention is not restricted to filler necks with insertion sections that narrow conically.

According to embodiments of the invention, the filler neck can have a first closure element, in particular in the form of a closure flap, which is assigned to the vehicle-tank-facing end region of the filler neck body. The first closure element or the first closure flap is preferably pre-stressed in a closed position in which the passage to the fuel tank is closed.

In this connection, it is basically conceivable for the fuel pump nozzle guide of the filler neck together with the insertion section to serve as a misfuelling block. This is true in particular if the insertion section narrows, for example narrows conically, in the direction of the vehicle tank, and the narrow cross section of the insertion section is smaller than the cross section of a diesel fuel pump nozzle and is larger than the cross section of a gasoline fuel nozzle or an AdBlue® or urea nozzle.

According to developments of this aspect, it is provided that the insertion section of the fuel pump nozzle guide narrows at least in regions in the direction of the vehicle tank, wherein a narrow cross section of the insertion section of the fuel pump nozzle guide is larger than the cross section of a gasoline nozzle or auxiliary agent nozzle, e.g. an AdBlue® or urea nozzle or water pump nozzle, and is smaller than the cross section of a diesel fuel pump nozzle or is larger than the cross-section of an auxiliary agent nozzle and is smaller than the cross section of a gasoline nozzle.

These embodiments prevent, for example, a diesel fuel pump nozzle, the cross section of which is larger than the cross section of a gasoline nozzle or an AdBlue® or urea nozzle, from passing through the narrow cross section of the insertion section of the fuel pump nozzle guide, said insertion section narrowing at least in regions in the direction of the fuel tank, and being able to open the closure element (first closure element/closure flap) arranged at the vehicle-tank-facing end region of the filler neck body.

In order, on the other hand, in the case of a filler neck for diesel fuel, to prevent misfuelling of the associated vehicle tank with, for example, gasoline, it is provided, according to one aspect of the present invention, that the misfuelling block, preferably as a partial region in the shape of the insertion section, is provided with an actuating element, wherein the actuating element is preferably designed as an actuating ring or as an actuating ring segment composed of resilient material or having radial prestressing, preferably with at least one axially parallel gap. The actuating element, preferably the actuating ring, preferably at its end facing the vehicle tank, has a locking section, preferably on at least one side of the at least one gap, wherein the locking section acts directly or indirectly on the first closure element and holds the first closure element in its closed position, wherein the locking section releases the first closure element when the actuating ring is expanded by a fuel pump nozzle.

In this connection, it is conceivable, for example, for the misfuelling block to have a slotted actuating ring composed of resilient material or having radial prestressing, with at least one axially parallel gap, wherein the actuating ring, at its end facing the vehicle tank, has a locking section on at least one side of the at least one gap, said locking section acting on the first closure element and holding the first closure element in the closed position, wherein the first closure element is moved or is movable from a closed position into the open position when the actuating ring is expanded by a fuel pump nozzle and the locking section releases the first closure element.

One possible realization of such an actuating ring is disclosed, for example, in the document EP 1 712 398 B1.

In this connection, it is provided, according to embodiments of the invention, that the filler neck is designed in such a manner that expansion of the actuating element is limited by a stop, at least when the filler neck is inserted into the filler pipe, preferably in such a manner that expansion of the actuating element is possible only to the extent that it is required for the preferably next largest fuel pump nozzle outside diameter.

This means, it is possible simply by means of the actuating element to prevent misfuelling both by a fuel pump nozzle which is too small and by one which is too large—no other cross sections are necessary for this purpose. For example, for the case of a vehicle having a gasoline engine, the actuating element defines a narrow cross section which is smaller than the diameter of a gasoline nozzle, but larger than the diameter of an auxiliary agent nozzle—and therefore the first closure element cannot be unlocked by the auxiliary agent nozzle, but only by a gasoline nozzle. At the same time, the actuating element is limited by a stop in such a manner that the narrow cross section cannot become as large as the outside diameter of a diesel fuel nozzle, and therefore it is not possible to insert said diesel fuel nozzle. The stop may be provided on the filler neck itself. However, the filler pipe itself may also be provided as the stop.

So that the filler neck can optionally be used with and without the actuating element/actuating ring, it is provided in an advantageous manner that the actuating element or the actuating ring is connected pivotably to the filler neck body and can be pivoted or folded into the filler neck body.

In this connection, it is in particular also appropriate to form the actuating element or the actuating ring at least in regions and the filler neck body together with the insertion section of the misfuelling block as an integral component, in particular casting and preferably plastics injection molding.

Alternatively thereto, the actuating element or the actuating ring can be constructed from at least two segments, wherein each segment of the actuating element or actuating ring is connected pivotably to the filler neck body and can be pivoted or folded into the filler neck body.

Nevertheless, it is also appropriate here to form the segments of the actuating element or actuating ring and the filler neck body together as an integral casting and in particular plastics injection molding, and in particular as an integral component, in particular casting and preferably plastics injection molding.

In particular, the actuating element or the actuating ring or segments of the actuating ring—as well as at least the second segment of the insertion section of the misfuelling block—can be connected to the filler neck body in a pivotable manner via at least one or more film hinges.

According to a preferred realization, it is provided that the actuating element is connected to the filler neck body in a pivotable manner via at least one film hinge. The at least one film hinge is preferably the same film hinge with which the respective segment of the insertion section is also connected to the filler neck body.

Alternatively thereto, the segments of the actuating element are each connected to the filler neck body in a pivotable manner via at least one film hinge, preferably the same film hinge with which the respective segment of the insertion section is also connected to the filler neck body.

Especially if the misfuelling block formed by the actuating element or the actuating ring is used with such an actuating element or actuating ring that is expanded by a suitable fuel pump nozzle and the locking section of the actuating element or actuating ring releases the first closure element, the narrow cross section of the insertion section of the fuel pump nozzle guide, said insertion section tapering, for example conically, in the direction of the vehicle tank, can also be smaller than the cross section of a diesel nozzle.

In particular, it is conceivable in this connection for the insertion section of the fuel pump nozzle guide to narrow at least in regions in the direction of the vehicle tank, wherein a narrow cross section of the insertion section of the fuel pump nozzle guide is larger than the cross section at least of a gasoline nozzle and is smaller than the cross section of a diesel fuel nozzle or is larger than the cross section of at least one auxiliary agent nozzle, for example AdBlue® or urea nozzle or water pump nozzle, and is smaller than the cross section of a gasoline nozzle.

In particular, the filler neck according to the invention is suitable for capless fuel filler systems. For this purpose, according to embodiments of the filler neck according to the invention, the filler neck body at its end region opposite the vehicle tank has a second closure element, in particular in the form of a closure flap, which is prestressed into a closed state and is moved into the open position by insertion of a fuel pump nozzle into that end region of the filler neck body which is opposite the fuel tank.

However, the invention is not restricted to filler necks for capless fuel filler systems. On the contrary, the filler neck according to the invention is suitable in the same manner and with the same advantages, in particular during the production and assembly, for conventional fuel filler systems with a cap.

The integration of a first and/or second closure flap (closure elements) in the filler neck can be formed in a sealed or non-sealed manner, and therefore said closure flap, in the closure position, very substantially prevents even small quantities of operating substance and optionally gases from overflowing. For this purpose, the corresponding closure flap and/or the filler neck body in the interior can comprise a sealing element, by means of which a gap formed between the filler neck body and the closure flap in the closure position thereof is sealed.

In order to avoid an escape of operating substance and optionally gases through a filler pipe leading between the outer surface of the filler neck and the vehicle tank, it can basically be provided that at least one sealing element which is arranged outside the filler neck body with respect to the longitudinal orientation of the filler neck is provided.

Such sealing between the outer region of the filler neck body and the filler pipe leading to the vehicle tank can be achieved in a structurally simple manner by the fact that the sealing element is designed as a sealing ring (for example O-ring or profiled sealing ring) which is furthermore preferably arranged for positional securing purposes in a circumferential groove on the outer wall of the filler neck body. However, integration of the sealing element may also be realized by means of a two-component production method (in particular two-component injection molding).

Preferably, at least two sealing elements are provided, of which in each case at least one is arranged on each side (with respect to the longitudinal orientation of the filler neck) outside the casing of the filler neck body.

In refinements of the invention, it is provided that the insertion section is designed in particular as an insertion section which is conical at least in regions and tapers in the direction of the vehicle tank, wherein the insertion section can be formed by radial ribs or blades that are spaced apart in the circumferential direction. The ribs or blades prevent an expansion of the actuating ring due to, for example, pressurized spray water.

BRIEF DESCRIPTION OF THE DRAWINGS

The invention will be explained in more detail below with reference to drawings, in which.

DETAILED DESCRIPTION

Figure 1:
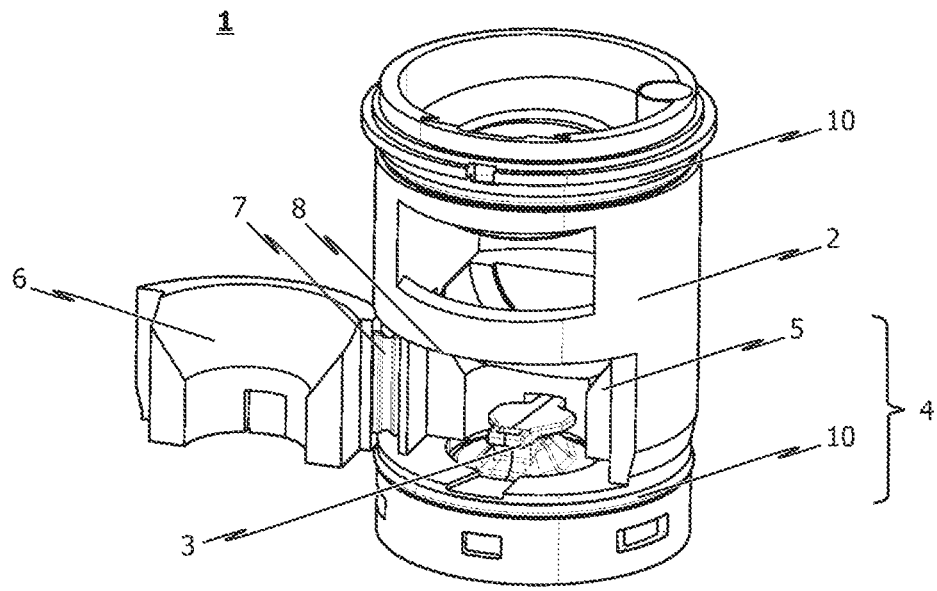
FIG. 1 shows, schematically and in an isometric view, an exemplary embodiment of the filler neck according to the invention in a state in which the second segment of the insertion section is present outside the filler neck body.
Figure 2:
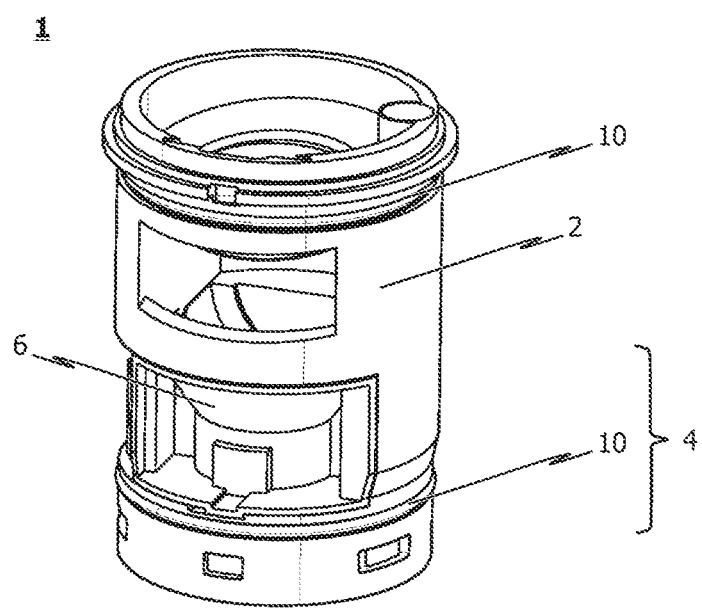
FIG. 2 shows, schematically and in an isometric view, the filler neck according to FIG. 1 in a state in which the second segment of the insertion section is pivoted into the filler neck body.
Figure 4:
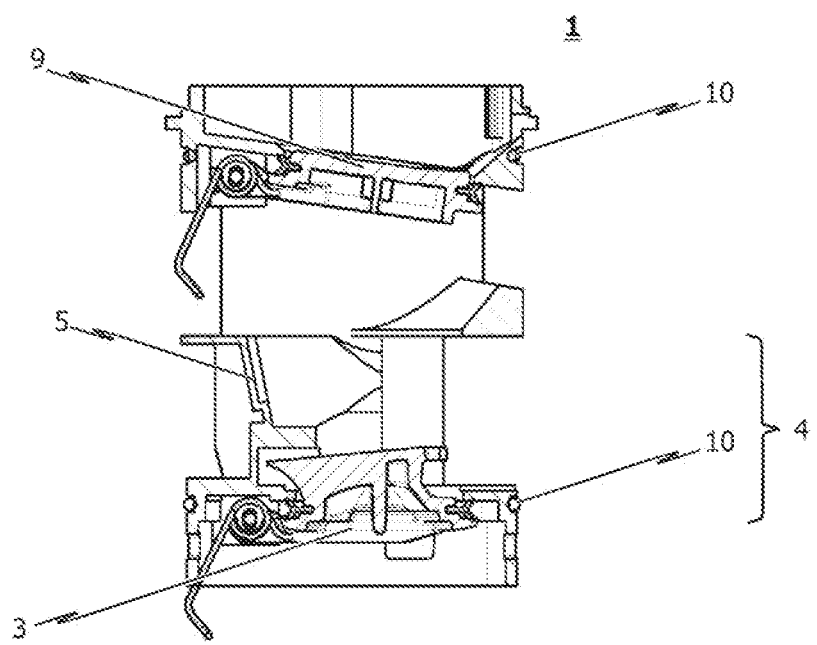
FIG. 4 shows, schematically and in a sectional view, the filler neck according to FIG. 3 along the line A-A in FIG. 3.
Figure 5:
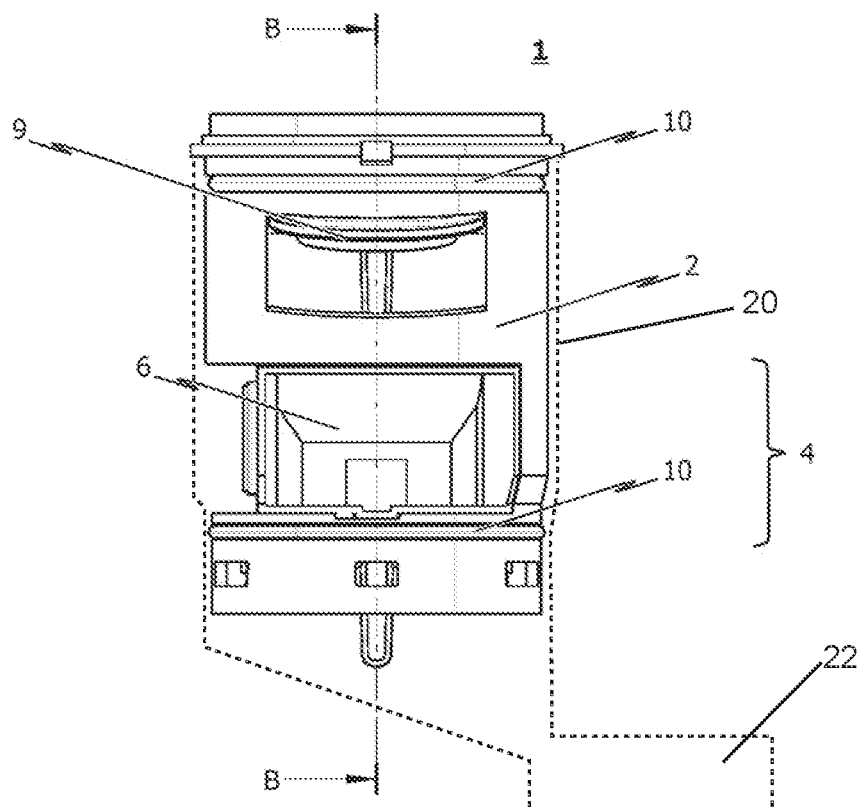
FIG. 5 shows, schematically and in a side view, the exemplary embodiment of the filler neck according to the invention in the state shown in FIG. 2.
Figure 6:
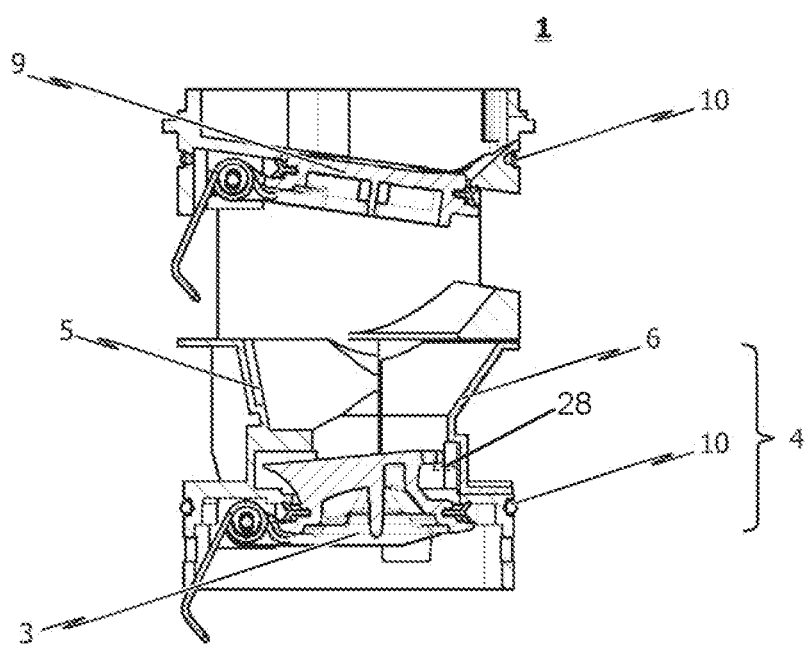
FIG. 6 shows, schematically, a sectional view of the filler neck according to FIG. 5 along the line B-B.

The attached drawings show an exemplary embodiment of a filler neck 1 in two different states, namely in a first state, in which a segment (the second segment 6) of the insertion section 4 of the fuel pump nozzle guide is not yet pivoted into the filler neck body (cf. FIGS. 1, 3 and 4), and in a state, in which the segment of the insertion section 4 (second segment 6) is pivoted into the filler neck body 2 (cf. FIGS. 2, 5 and 6).

The filler neck 1 serves in general for filling an operating substance (such as, for example, a fuel or AdBlue® or urea) into a fuel tank, not illustrated in the drawings, by means of a fuel pump nozzle, likewise not illustrated in the drawings.

The filler neck 1 has a filler neck body 2, which can be accommodated in a filler pipe 20 leading to the vehicle tank 22, both shown schematically in FIG. 5. The filler pipe leads to the vehicle tank which has already been mentioned and, at its free end region, can have, for example, a radially inwardly pointing bead which interacts with corresponding spring tongues on the outer side of the filler neck body 2, which is preferably composed of plastic, in order to axially secure the filler neck body 2.

As can be gathered in particular from the illustration in FIG. 1 and the sectional views in FIG. 4 and FIG. 6, the filler neck 1 has a first closure element 3 in the form of a closure flap which is assigned to the vehicle-tank-facing end region of the filler neck body 2.

Said (first) closure element 3 which is mounted pivotably on the filler neck body 2 is prestressed with the aid of a spring into its basic position in which the first closure element is present in its closed position and closes the passage to the vehicle tank. In principle, the first closure element 3 is designed such that it can be pressed out of the prestressed basic position by a fuel pump nozzle into an open position opening up the passage to the vehicle tank.

The exemplary embodiment of the filler neck 1 according to the invention is furthermore provided with a fuel pump nozzle guide, wherein the fuel pump nozzle guide has an insertion section 4 which narrows conically in the direction of the vehicle tank if the individual segments 5, 6 of the insertion section 4 are arranged in the filler neck body 2 (cf. FIG. 2, FIG. 5 and FIG. 6). In this state, the narrow cross section of the insertion section 4 is selected in such a manner that said narrow cross section is smaller than the cross section of at least a diesel fuel pump nozzle.

It should be taken into consideration here that it is customary to provide nozzles or fuel pump nozzles for dispensing diesel fuel with a larger diameter than the nozzles or fuel pump nozzles for dispensing gasoline or AdBlue® or urea. Consequently, a person cannot unintentionally dispense diesel fuel from a diesel fuel pump nozzle into a vehicle tank of a vehicle that is operated with gasoline and, specifically at the inlet end of the car fuel system, has a smaller opening than the diameter of a diesel fuel dispensing nozzle.

Using a further example, a urea dispensing nozzle generally has a diameter of 19 mm and a gasoline dispensing nozzle generally has a dimeter of 21 mm. Vehicle fuel systems which are intended to receive such fuels are provided with fuel system inlet openings which are only minimally larger than the dispensing nozzle diameter of the designated fuel. Diameters for diesel fuel refueling system dispensing nozzles that are provided for passenger vehicles and light trucks are generally between 23.6 mm and 25.5 mm while diesel fuel dispensing nozzles having a high throughflow rate and that are provided for heavy duty trucks are provided with diameters from 28.5 mm to 38 mm in order to permit a more rapid dispensing of larger fuel volumes. The inlet openings of vehicle fuel systems that are intended to be refueled with diesel fuel are in turn provided with opening diameters which are only minimally larger than the dispensing nozzle diameters from which they are intended to be refueled.

Consequently, it can be assumed that the nozzle for diesel fuel dispensing systems generally does not fit into the refueling inlet openings of gasoline or urea fuel systems, and it is therefore unlikely that a fuel system which requires gasoline or urea will be unintentionally refueled with diesel fuel. However, because of the larger diameter at the refueling inlet openings of diesel fuel systems, a vehicle which requires diesel fuel may be unintentionally refueled from a refueling system which has a urea dispensing nozzle or a gasoline dispensing nozzle. Refueling with the wrong fuel may cause damage to fuel systems and engines and therefore has to be avoided.

The filler neck 1 according to the invention, as is illustrated with reference to an exemplary embodiment in the drawings, is distinguished in particular in that the filler neck body 2 and the insertion section 4 of the fuel pump nozzle guide are formed as a joint, integral plastics casting and in particular plastics injection molding.

For this purpose, it is provided, in the exemplary embodiment, to divide the insertion section 4 of the fuel pump nozzle guide into a plurality of segments 5, 6 (here precisely two), wherein a first segment 5 is formed integrally in the interior of the filler neck body 2 and is connected fixedly to the filler neck body 2, and wherein the remaining, second segment 6 is connected to the filler neck body 2 in an articulated manner.

An overall view in particular of FIGS. 1 and 2 reveals that, in the exemplary embodiment of the filler neck 1 according to the invention, the second segment 6 of the insertion section 4 of the fuel pump nozzle guide is pivotable relative to the filler neck body 2 between a first position, in which the second segment 6 is present outside the filler neck body 2 (cf. FIG. 1), and a second position, in which the second segment 6 is present within the filler neck body 2 and, together with the first segment 5, forms the conical narrowing in the direction of the vehicle tank (cf. FIG. 2).

In detail, for the pivotable coupling of the second segment 6, use is made of a film hinge 7 via which the second segment 6 is connected to the filler neck body 2 so as to be pivotable relative to the filler neck body 2. A pivot axis defined by the film hinge 7 runs parallel here to the longitudinal axis of the filler neck body 2.

Figure 3:
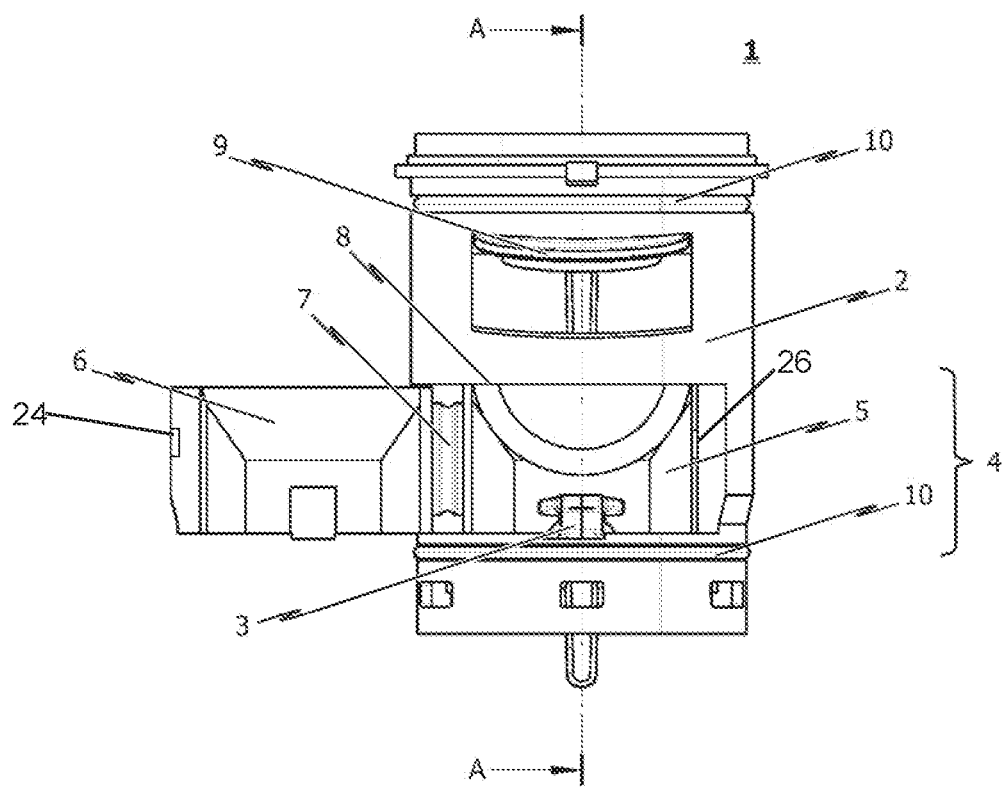
FIG. 3 shows, schematically and in a side view, the exemplary embodiment of the filler neck according to the invention in the state shown in FIG. 1.

Furthermore, it can be gathered in particular from the illustrations in FIG. 1 and FIG. 3 that the filler neck body 2 at least in regions has a cylindrical lateral surface with a window region 8, wherein the window region 8 is closed when the second segment 6 is pivoted into the filler neck body 2 and is present in its second position.

In order to fix the second segment 6 of the insertion section 4 to the filler neck body 2 when the second segment 6 is pivoted into the filler neck body 2 and is present in its second position, the second segment 6 can correspondingly have at least one latching or locking element 24 which interacts with a latching or locking element 26, formed in a correspondingly complementary manner with respect thereto, on the filler neck body 2.

In this exemplary embodiment, the fuel pump nozzle guide used in the filler neck 1 shown in the drawings is designed to prevent a diesel fuel nozzle which is inserted into the filler neck 1 from reaching the first closure element 3 and therefore being able to push the latter open. For this purpose, in the exemplary embodiment, shown in the drawings, of the filler neck 1 according to the invention, it is provided that the narrow cross section of the insertion section 4 of the fuel pump nozzle guide is smaller than the cross section of a diesel fuel nozzle and is at least the same size as the cross section of a gasoline nozzle or an AdBlue® or urea nozzle.

In order, conversely, to provide a filler neck 1 for filling diesel fuel into a vehicle tank with a corresponding misfuelling block which prevents an operating substance being filled into the vehicle tank by means of a gasoline nozzle or AdBlue® or urea nozzle, it can be provided, according to an embodiment, not shown in the drawings, of the filler neck 1 according to the invention that the misfuelling block has, for example, a slotted actuating ring composed of resilient material or having radial prestressing, with an axially parallel gap, wherein the actuating ring, at its end facing the vehicle tank, has a locking section 28, on at least one side of the gap, wherein the locking section acts on the first closure element and holds the first closure element 3 in the closed position, wherein the first closure element 3 is movable from a closed position into the open position when the actuating ring is expanded by a suitable fuel pump nozzle, and the locking section releases the first closure element 3.

In order to avoid an escape of operating substance and optionally gases through a filler pipe leading between the outer surface of the filler neck 1 and the vehicle tank, in the embodiment of the filler neck 1 that is shown in the drawings a total of two sealing elements 10 which are arranged outside the filler neck body 2 with respect to the longitudinal orientation of the filler neck 1 are provided.

Figure 7:
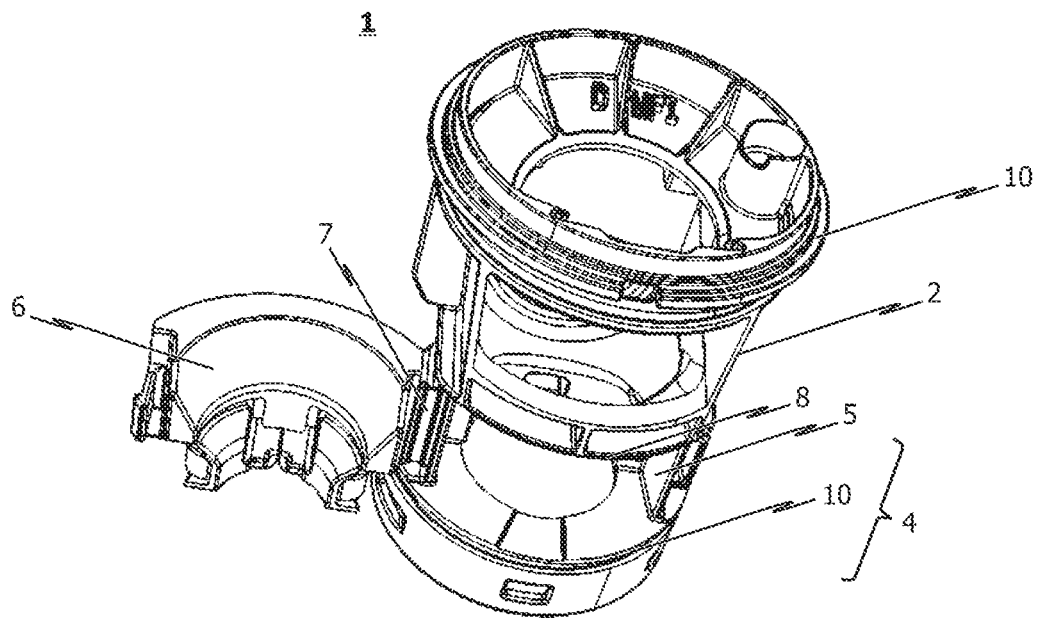
FIG. 7 shows, schematically and in an isometric view, a further exemplary embodiment of the filler neck according to the invention in a state in which the second segment of the insertion section is present outside the filler neck body.
Figure 8:
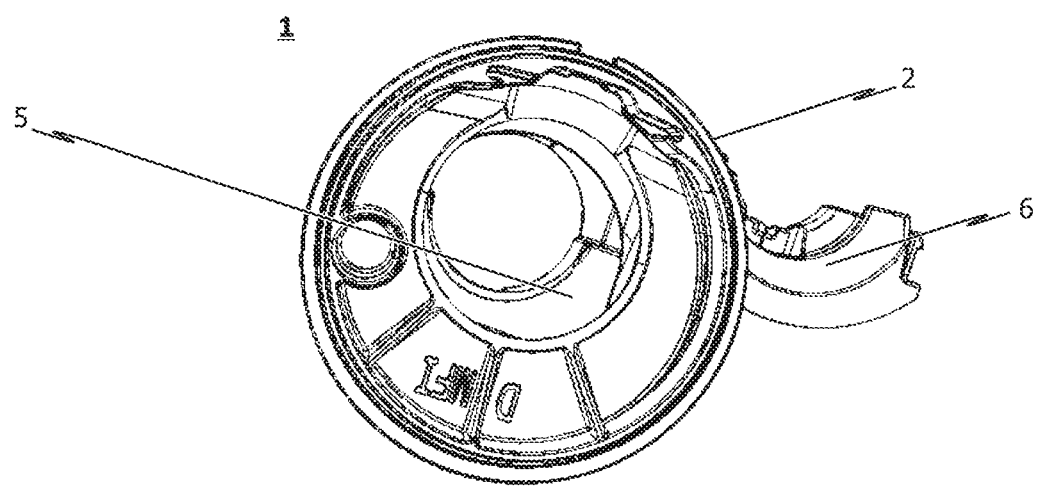
FIG. 8 shows, schematically, the filler neck according to FIG. 7 in a plan view from above, i.e. in the insertion direction of a fuel pump nozzle.

A second exemplary embodiment of the filler neck 1 according to the invention is described below with reference to the illustrations in FIG. 7 to FIG. 10. In detail, FIG. 7 shows, schematically and in an isometric view, the filler neck 1 of this further embodiment, specifically in a state in which the second segment 6 of the insertion section 4 is present outside the filler neck body 2. FIG. 8 shows the filler neck 1 according to FIG. 7 in a plan view from above, i.e. in the insertion direction of a fuel pump nozzle.

Figure 9:
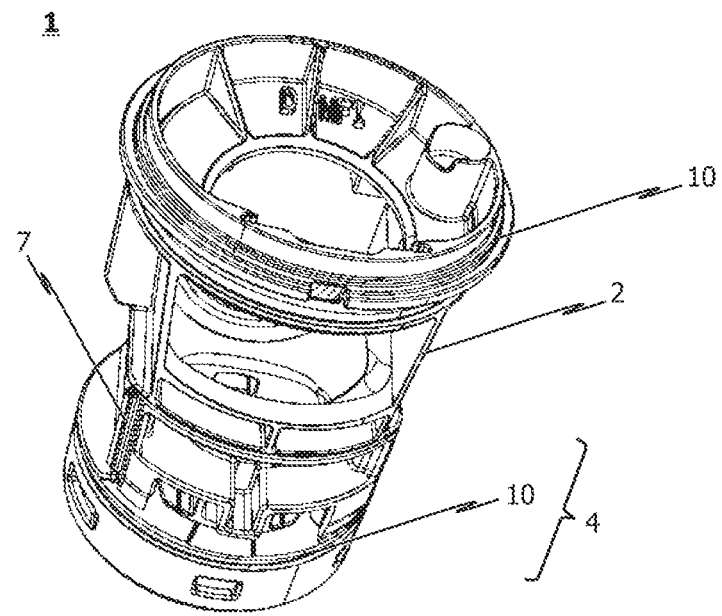
FIG. 9 shows, schematically and in an isometric view, the filler neck according to FIG. 7 in a state in which the second segment of the insertion section is pivoted into the filler neck body.
Figure 10:
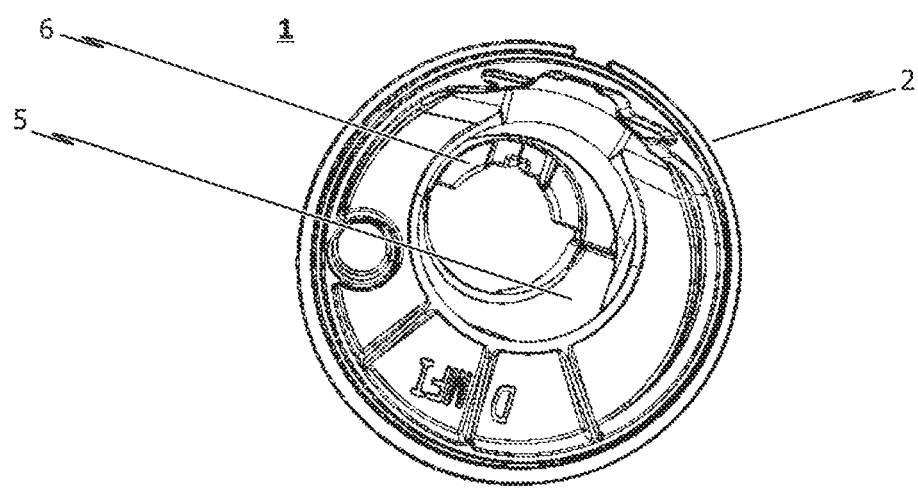
FIG. 10 shows, schematically, the filler neck according to FIG. 9 in a plan view from above, i.e. in the insertion direction of a fuel pump nozzle.
Figure 11:
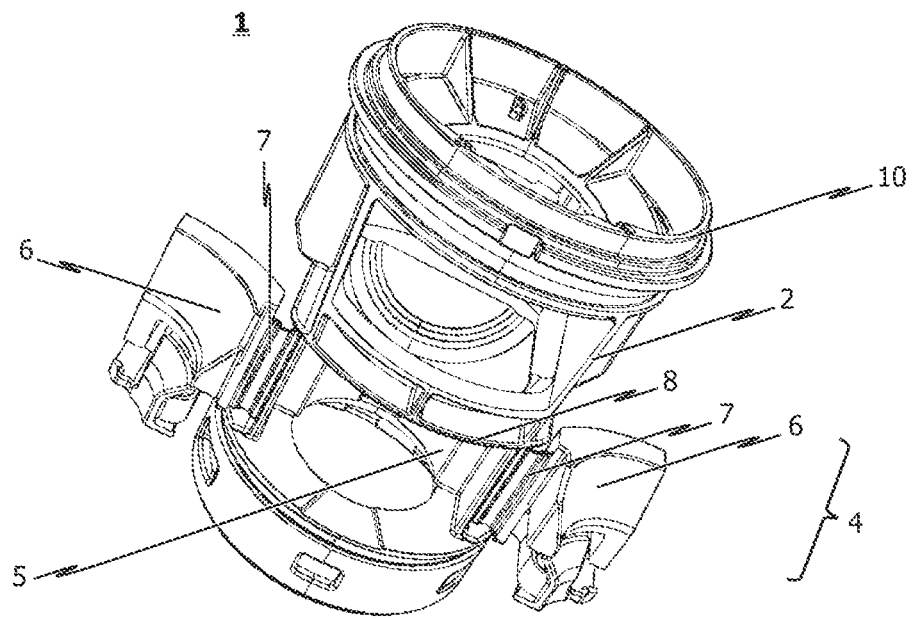
FIG. 11 shows, schematically and in an isometric view, a further exemplary embodiment of the filler neck according to the invention in a state in which the second segment of the insertion section is present outside the filler neck body.
Figure 12:
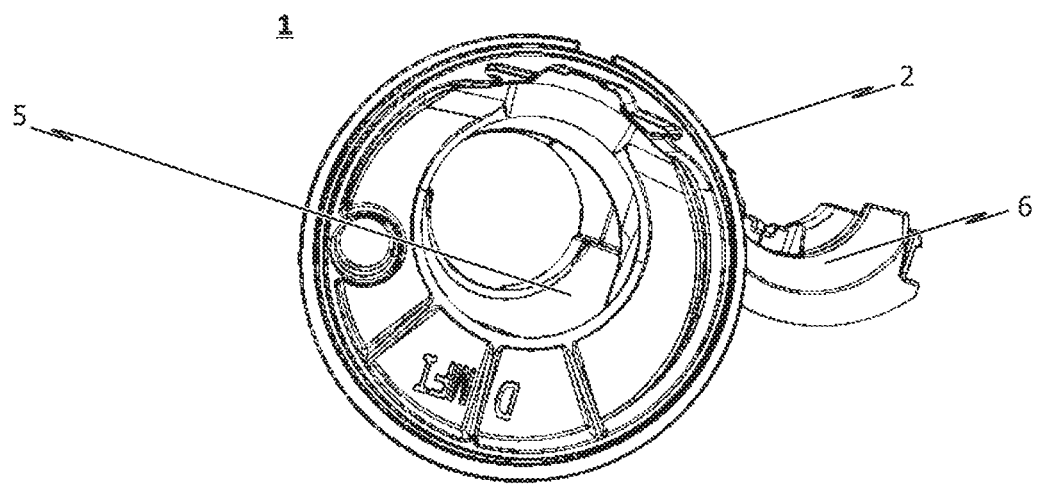
FIG. 12 shows, schematically, the filler neck according to FIG. 11 in a plan view from above, i.e. in the insertion direction of a fuel pump nozzle.
Figure 13:
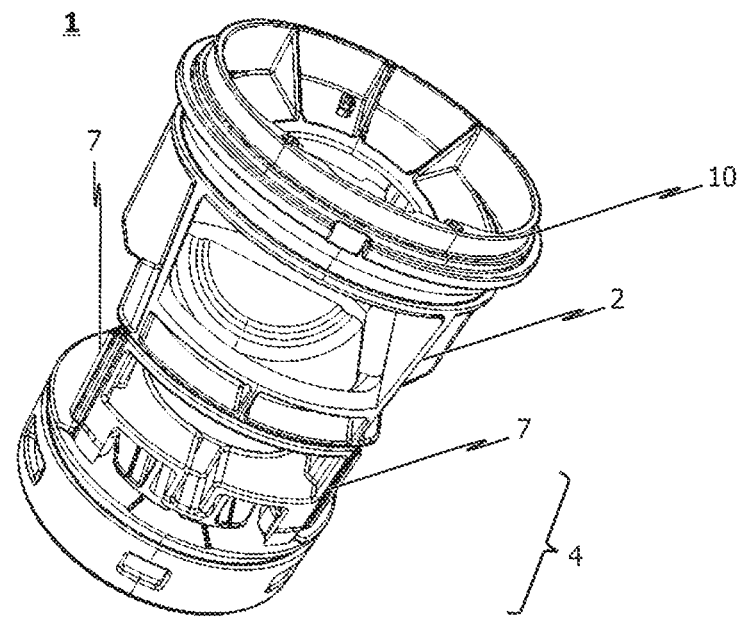
FIG. 13 shows, schematically and in an isometric view, the filler neck according to FIG. 11 in a state in which the second segment of the insertion section is pivoted into the filler neck body.
Figure 14:
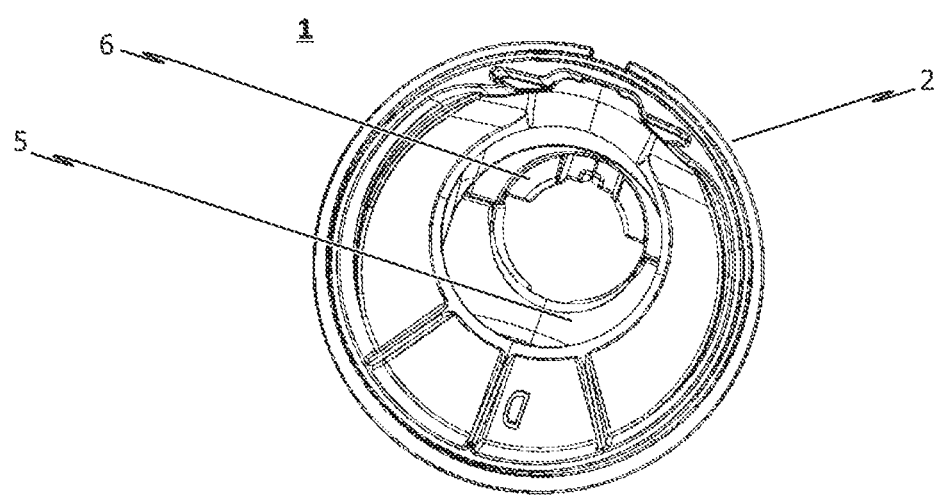
FIG. 14 shows, schematically, the filler neck according to FIG. 13 in a plan view from above, i.e. in the insertion direction of a fuel pump nozzle.

FIG. 9 shows, schematically and in an isometric view, the filler neck 1 according to FIG. 7, but this time in a state in which the second segment 6 of the insertion section 4 is pivoted into the filler neck body 2. FIG. 10 shows the filler neck 1 according to FIG. 9 in a plan view from above.

Like the filler neck 1 according to the embodiment shown in FIG. 1 to FIG. 6, the filler neck 1 according to the further embodiment serves in general for filling an operating substance into a vehicle tank, not illustrated in the drawings, by means of a fuel pump nozzle, likewise not illustrated. The filler neck 1 has a filler neck body 2 which can be accommodated in a filler pipe (not illustrated) leading to the vehicle tank.

Although not illustrated in FIG. 7 to FIG. 10, the filler neck 1 can have a (first) closure element which is mounted pivotably on the filler neck body 2, such as the first closure element 3 of the embodiment according to FIG. 1.

Furthermore, in the further embodiment of the filler neck 1 according to the invention according to FIG. 7 to FIG. 10, a second closure element, in particular in the form of a closure flap, is not illustrated although such a second closure element may of course be correspondingly provided.

The embodiment of the filler neck 1 according to the invention according to FIG. 7 to FIG. 10 differs from the filler neck 1 according to FIG. 1 to FIG. 6 in particular by the configuration and connection of the second segment 6 of the insertion section 4 to the filler neck body 2.

The filler neck 1 according to the embodiment shown in FIG. 7 to FIG. 10 is an MFI filler neck 1 (MFI=Miss-Fuel-Inhibitor) for filling gasoline into a vehicle tank by means of a fuel pump nozzle. The MFI filler neck 1 prevents auxiliary agents, such as, for example, water or urea, from being able to be filled into the vehicle tank.

In the embodiment shown in FIG. 7 to FIG. 10, it is provided in particular that the second segment 6 of the insertion section 4, which second segment is foldable via the film hinge 7, serves itself as an actuating element for actuating a closure element, not illustrated in FIG. 7 to FIG. 10.

FIG. 11 to FIG. 14 show a variant of the embodiment shown in FIG. 7 to FIG. 10, in which a total of two second segments 6 are provided which are each connected to the filler neck body 2 of the filler neck 1 via a film hinge 7.

As also in the embodiment shown in FIG. 7 to FIG. 10, it is provided, in the embodiment according to FIG. 11 to FIG. 14, that the segments 6 which are foldable via the film hinges 7 themselves together form an actuating element for actuating a (second) closure element, not shown in FIG. 11 to FIG. 14, as required.

The film hinges 7, via which the second segments 6 are connected to the filler neck 1, can realize an expanding movement of the segments 6 in the folded state, specifically via their provided mobility, in order thus to actuate the (second) closure element as required.

Accordingly, it is apparent that the misfuelling function or misfuelling unit can also form the insertion section 4 of the fuel pump nozzle guide. In other words, an insertion section 4 and, separately therefrom, an actuating ring or actuating element for the second closure element do not always have to be provided.

Furthermore, the actuating element does not always have to be formed completely or partially annularly. In particular, according to variant embodiments, the second closure element (closure flap) is opened only by the fuel pump nozzle introduced into the filler neck 1 pressing against the second closure element, and not inevitably automatically by the expansion of the actuating element.

As illustrated in the drawings, the exemplary embodiment of the filler neck 1 according to the invention is suitable in particular for a capless fuel filler system. For this purpose, the filler neck body 2 has, at its end region opposite the vehicle tank, a second closure element 9, in particular in the form of a closure flap, which is prestressed into a closed state and is moved into the open position by insertion of a fuel pump nozzle into that end region of the filler neck body 2 which lies opposite the vehicle tank.

The invention is not restricted to the exemplary embodiment shown in the drawings but rather emerges from an overall view of all of the features disclosed herein

LIST OF REFERENCE SIGNS

1 Filler neck
2 Filler neck body
3 First closure element
4 Insertion section of the fuel pump nozzle guide
5 First segment of the insertion section
6 Second segment of the insertion section
7 Film hinge
8 Window region
9 Second closure element
10 Sealing element

What is claimed is:

1. A filler neck (1) for filling an operating substance into a vehicle tank by way of a fuel pump nozzle, wherein the filler neck (1) includes:
   a filler neck body (2) configured for positioning in a filler pipe leading to the vehicle tank; and
   a fuel pump nozzle guide with an insertion section (4) for guiding a fuel pump nozzle, which is accommodated or is to be accommodated in the filler neck body (2), in a direction of the vehicle tank,
      wherein the filler neck body (2) and the insertion section (4) of the fuel pump nozzle guide are formed together as an integral casting formed by plastics injection moulding;
      wherein the insertion section (4) of the fuel pump nozzle guide has a first segment (5) which is formed integrally with the filler neck body (2) and is connected fixedly to the filler neck body (2) in the interior of the filler neck body (2) and at least one second segment (6) which is connected in an articulated manner to the filler neck body (2), wherein the second segment (6) is pivotable relative to the filler neck body (2) between a first position, in which the second segment (6) is present outside the filler neck body (2), and a second position, in which the second segment (6) is present within the filler neck body (2) and, together with the first segment (5), forms the fuel pump nozzle guide.

2. The filler neck (1) as claimed in claim 1, wherein the at least one second segment (6) is connected via at least one film hinge (7) to the filler neck body (2) so as to be pivotable relative to the filler neck body (2), wherein a pivot axis defined by the film hinge (7) runs parallel to the longitudinal axis of the filler neck body (2).

3. The filler neck (1) as claimed in claim 1, wherein the filler neck body (2) at least in regions has a cylindrical lateral surface with a window region (8), wherein the window region (8) is closed when the at least one second segment (6) is pivoted into the filler neck body (2) and is present in its second position.

4. The filler neck (1) as claimed in claim 1, wherein the at least one second segment (6) of the insertion section (4) has at least one latching or locking element for fixing the second segment (6) on the filler neck body (2) when the second segment (6) is pivoted into the filler neck body (2) and is present in its second position.

5. The filler neck (1) as claimed in claim 1, wherein the filler neck (1) furthermore has the following: a first closure element (3), in the form of a closure flap, which is assigned to the vehicle-tank-facing end region of the filler neck body (2) and which, in its closed position, closes the passage to the vehicle tank, wherein the first closure element (3) is prestressed into its closed position.

6. The filler neck (1) as claimed in claim 1, wherein the insertion section (4) of the fuel pump nozzle guide narrows at least in regions in the direction of the vehicle tank, wherein a narrow cross section of the insertion section (4) of the fuel pump nozzle guide is larger than the cross section of a petrol nozzle or an auxiliary agent nozzle and is smaller than the cross section of a diesel fuel pump nozzle or is larger than the cross section of an auxiliary agent nozzle and is smaller than the cross section of a petrol nozzle.

7. The filler neck (1) as claimed in claim 5, wherein the filler neck (1) furthermore has the following: a misfuelling block, with an actuating element, wherein the actuating element has a locking section, wherein the locking section acts directly or indirectly on the first closure element (3) and holds the first closure element (3) in its closed position, wherein the locking section releases the first closure element (3) when the actuating element is expanded by a fuel pump nozzle.

8. The filler neck (1) as claimed in claim 7, wherein the filler neck (1) is designed in such a manner that expansion of the actuating element is limited by a stop, at least when the filler neck is inserted into the filler pipe, in such a manner that expansion of the actuating element is possible only to the extent that it is required for the next largest fuel pump nozzle outside diameter.

9. The filler neck (1) as claimed in claim 7, wherein the actuating element is connected pivotably to the filler neck body (2) and to enable the actuating element be pivoted or folded into the filler neck body (2); or wherein the actuating element is constructed from at least two segments, wherein each segment of the actuating element is connected pivotably to the filler neck body (2) and to enable the actuating element to be pivoted or folded into the filler neck body (2).

10. The filler neck (1) as claimed in claim 7, wherein the actuating element or the segments of the actuating element and the filler neck body (2) are formed together as an integral casting formed by plastics injection moulding.

11. The filler neck (1) as claimed in claim 5, wherein the filler neck (1) furthermore has the following: a misfuelling block, with an actuating element, wherein the actuating element has a locking section, wherein the locking section acts directly or indirectly on the first closure element (3) and holds the first closure element (3) in its closed position, wherein the locking section releases the first closure element (3) when the actuating element is expanded by a fuel pump nozzle; wherein the actuating element is connected to the filler neck body (2) in a pivotable manner via at least one film hinge; or wherein the segments of the actuating element are each connected to the filler neck body (2) in a pivotable manner via at least one film hinge.

12. The filler neck (1) as claimed in claim 1, wherein the filler neck body (2) at its end region opposite the vehicle tank has a second closure element (9) in the form of a closure flap, which is prestressed into a closed state and is moved into an open position by insertion of a fuel nozzle or AdBlue® or urea or additive nozzle into that end region of the filler neck body (2) which is opposite the vehicle tank.

13. The filler neck (1) as claimed in claim 1, wherein the insertion section (4) of the fuel pump nozzle guide is designed to surround a fuel pump nozzle, which is accommodated in the filler neck body (2), circumferentially by more than 180 degrees.

14. A fuel filler system with a filler neck (1) as claimed in claim 1, wherein the fuel filler system is preferably a capless fuel filler system.

15. The filler neck (1) as claimed in claim 13, wherein the fuel pump nozzle guide is designed to surround a fuel pump nozzle, which is accommodated in the filler neck body (2), in a completely encircling manner annularly.

16. A filler neck (1) for filling an operating substance into a vehicle tank by way of a fuel pump nozzle, wherein the filler neck (1) includes:
a filler neck body (2) configured for positioning in a filler pipe leading to the vehicle tank, wherein in the filler neck body includes an internal passage and a window opening (8) through the opening to the internal passage;
a fuel pump nozzle guide with an insertion section (4) for guiding a fuel pump nozzle inserted into the filler neck body (2) in a direction of the vehicle tank;
a first closure element (3) located at a vehicle-tank-facing end region of the filler neck body (2) and which, in its closed position, closes a vehicle tank fill passage;
wherein the filler neck body (2) and the insertion section (4) of the fuel pump nozzle guide are formed together as an integral casting formed by plastics injection moulding;
wherein the insertion section (4) of the fuel pump nozzle guide has a first segment (5) which is formed integrally with the filler neck body (2) and is connected fixedly to the filler neck body (2) in the interior of the filler neck body (2) and at least one second segment (6) which is connected in an articulated manner to the filler neck body (2), wherein the second segment (6) is pivotable relative to the filler neck body (2) between a first position, in which the second segment (6) is present outside the filler neck body (2) and away from the window opening (8) such that the closure element (3) is accessible through the window opening (8) in the filler neck body, and a second position, in which the second segment (6) is present within the filler neck body (2) and prevents access to the closure element (3) through the window opening (8) in the filler neck body;

wherein, when the second segment (6) is in the second position, the second segment (6), together with the first segment (5), forms a misfuelling block of the fuel pump nozzle guide.

17. A filler neck (1) for filling an operating substance into a vehicle tank by way of a fuel pump nozzle, wherein the filler neck (1) includes:

a filler neck body (2) configured for positioning in a filler pipe leading to the vehicle tank, wherein in the filler neck body includes an internal passage and a window opening (8) through the opening to the internal passage;

a fuel pump nozzle guide with an insertion section (4) for guiding a fuel pump nozzle inserted into the filler neck body (2) in a direction of the vehicle tank;

wherein the filler neck body (2) and the insertion section (4) of the fuel pump nozzle guide are formed together as an integral casting formed by plastics injection moulding;

wherein the insertion section (4) of the fuel pump nozzle guide has a first segment (5) which is formed integrally with the filler neck body (2) and is connected fixedly to the filler neck body (2) in the interior of the filler neck body (2) and at least one second segment (6) which is connected in an articulated manner to the filler neck body (2), wherein the second segment (6) is pivotable relative to the filler neck body (2) between a first position, in which the second segment (6) is present outside the filler neck body (2), and a second position, in which the second segment (6) is present within the filler neck body (2);

wherein the second segment (6) is connected via at least one film hinge (7) to the filler neck body (2) so as to be pivotable relative to the filler neck body (2), wherein a pivot axis defined by the film hinge (7) runs parallel to the longitudinal axis of the filler neck body (2).

* * * * *